Jan. 10, 1967

J. G. DRESSER 3,296,913

DATA TAPE PUNCHING DEVICE

Filed July 16, 1965

INVENTOR.

JASPER GILBERT DRESSER

BY

Barlow & Barlow

ATTORNEYS

United States Patent Office 3,296,913
Patented Jan. 10, 1967

3,296,913

DATA TAPE PUNCHING DEVICE

Jasper Gilbert Dresser, Boynton Beach, Fla., assignor to Dresser Products Incorporated, a corporation of Rhode Island Filed July 16, 1965, Ser. No. 472,428
2 Claims. (Cl. 83—467)

This invention relates to a data tape punching device, more particularly to a portable unit for correcting some error which may have occurred at the time the tape is punched.

One of the objects of this invention is to provide a device in which the tape may be positively positioned longitudinally and then the punch moved laterally so that it may punch a hole in any one of a plurality of data channels on the tape.

Another object of the invention is to provide a simple and inexpensive construction which will accurately locate the punch.

Another object of the invention is to provide a device of such a size that it may be readily portable from one location to another.

With these and other objects in view, the invention consists of certain novel features of construction as will be more fully described and particularly pointed out in the appended claims.

Figures 1, 2, 3, 4:
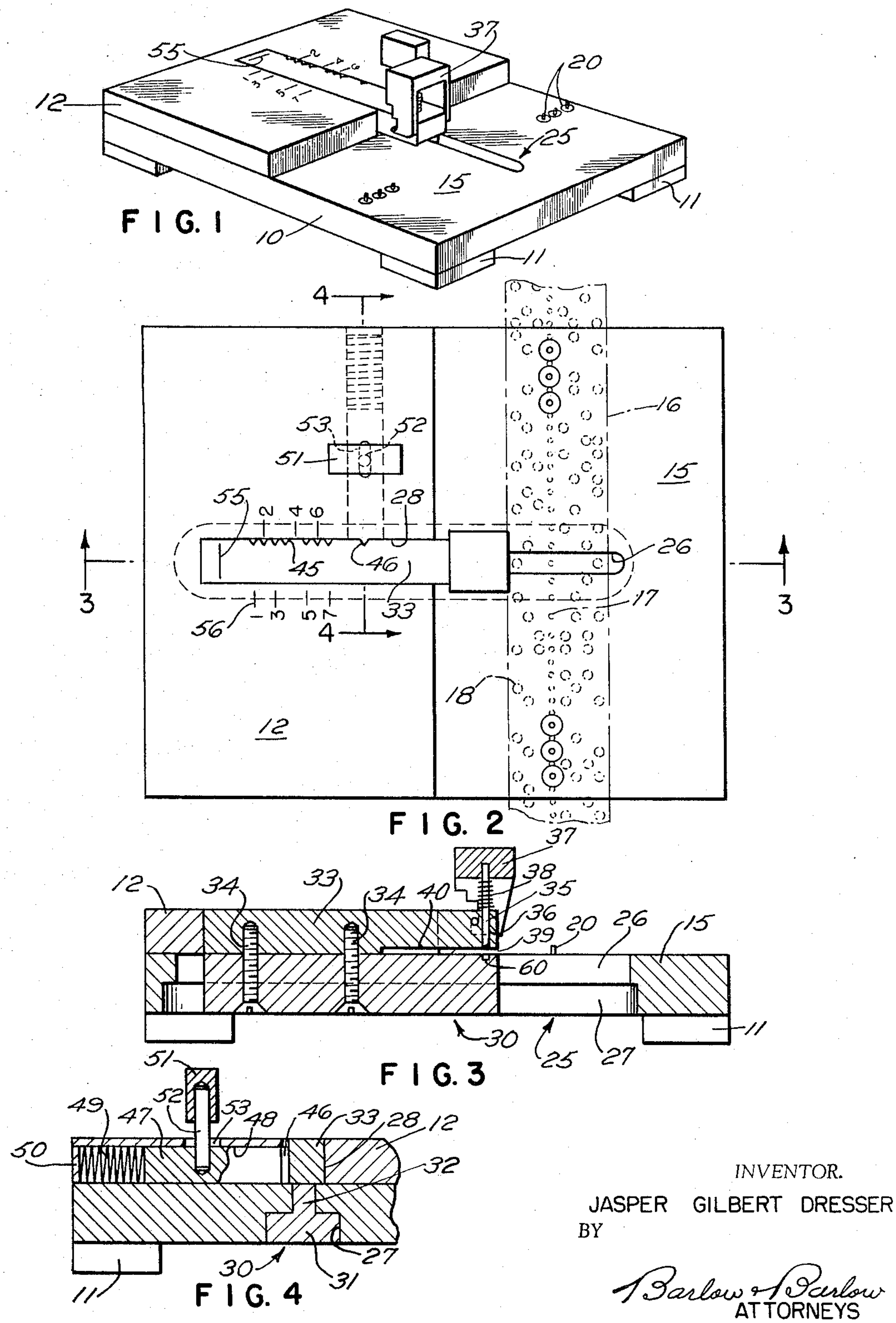
FIG. 1 is a perspective view looking at the top of the device.
FIG. 2 is a top plan view.
FIG. 3 is a section on line 3—3 of FIG. 2.
FIG. 4 is a section on substantially line 4—4 of FIG. 2.

In proceeding with this invention, I provide a base or body having a surface upon which the data tape must rest and some guiding or positioning means to locate the tape at a definite position on this surface. I then provide a slide carrying a punch which will be guided laterally across the lengthwise extent of the tape with means for holding it in any one of a plurality of selected positions with reference to the guide so that ony one of the lines of holes or channels in the tape may be supplemented by the punch carried by the lateral slide. Also to assist in locating the slide for operation in a data channel of the tape, there is a pawl which may engage a selected notch to positively position the slide in the desired position of the lines of holes in the tape.

With reference to the drawings, 10 designates the body which is generally rectangular in plan and is suitably supported on feet 11 at the four corners thereof. At one part of this body there is a superimposed or built-up portion 12 which is suitably secured to the lower portion 10 so as to be fixed therewith. The body may also be formed of a solid block cut to provide a thicker portion at one side and a thinner portion at the other side. The portion 10 has a surface 15 generally flat upon which the tape may rest. The data tape shown in FIG. 2 and designated 16 has a plurality of drive openings 17 extending lengthwise. Raised from the surface 15 are a plurality of guides 20 spaced so that they may enter the openings 17 and locate the tape positively with reference to the surface 15. This tape also has data holes 18 located therein in any one of a plurality of rows therein extending lengthwise of the tape, and it is such openings which may have been omitted from the tape or needed in a new splicing section placed in the tape should an error have occurred and which openings it is desired that this device will provide.

The body 10 and 12 is slotted as at 25 at substantially right angles to the general extent of the tape and the guides 20 for directing the slide or carrier for the punch laterally across the tape. This slot 25 has an upper narrow portion 26 and a wider portion 27 causing the same to be an inverted T shape in the portion 10 of the body, while in the portion 12 of the body, the slot 28 is of a width greater than the narrow slot 26 but narrower than the slot 27, which slots in their configurations above mentioned and shown in FIG. 4 provide the guideway for the slide or punch carrier. This slide or punch carrier comprises a block 30 which is inverted T shape in cross section as seen in FIG. 4 with the lower part 31 of a size to fit and slidably engage the sides of the slot 27, while the upper portion 32 is of a size to slidably fit in the portion 26 of the slot and engage the side walls thereof to be guided thereby. The punch mounting member 33 is secured to the lower part 31 of the slide by screws 34 as seen in FIG. 3, and is of a width to engage the side walls of the slot 28 so as to slide therein, its top being flush with the adjoining surface of the body part 12.

The punch comprises a plunger 35 guided in an opening 36 in the forward part of the mounting member 33. A handle 37 is secured to the punch at its upper end and held in raised position by a spring 38 and when moved to its lower position enters recess 60 in block 30. This mounting member 33 is also undercut as at 39 so as to leave a sufficient space between its upper edge 40 and the surface 15 of the body so that it will pass freely over a tape. Thus the slide comprising the parts just described may be moved laterally in the slot provided in the body over the tape. In order to locate this slide in a desired position with reference to the tape, there is a plurality of notches 45 in one edge of the slide member 33 into which the tongue 46 of a pawl 47 may be positioned. This pawl 47 is guided in a bore 48 in the portion 12 of the body. Preferably this bore is rectangular and the pawl is rectangular so that its tongue 46 may be vertically disposed to correspond to the vertical extent of the notches 45 in the portion 33 of the slide. The pawl is spring pressed as at 49 which spring means is held in position by a plug 50 fixed in the end of the bore and engaging the spring. This pawl may be retracted for moving the slide laterally of the body by a handle 51 having a pin 52 which extends through a slot 53 in the top wall of the body portion 12.

By the above arrangement the tape may be positioned upon the guides 20 and the slide may be moved laterally of the tape to a selected channel or line of data openings which it is desired to punch, and then when so positioned and the pawl is in engagement with its proper notch, the handle 37 may be pressed downwardly to cause the plunger 35 to pierce the tape and enter a recess 60 in block 30. In order to assist in the location of the slide in the desired position, there is a datum line 55 on the slide and different indicia 56 along the sides of the top surface of the member 12 so that when this datum line 55 is in alignment with a selected one of the indicia 56 which may be either the first row, second row, etc., it will be known at which position this punch is located with reference to the tape.

I claim:

1. A data tape punching device comprising a body having a slot in said body presenting a generally horizontal tape supporting surface on either side of said slot, a guide upstanding from said body at generally right angles to said slot for engaging the tape to locate the tape on said surface, a slide movable in said slot laterally with respect to said upstanding guide and having an overhanging portion with an anvil beneath to be moved over the tape when the tape is engaging said guide, punching means carried by said overhanging portion to punch a hole in the tape beneath it, and means to selectively hold the slide in different positions with reference to said guide.

2. A data tape punching device as in claim 1 wherein said slide has notches spaced along its edge and a spring pressed pawl is mounted on said body to engage one of said notches depending upon the selected position of said slide, said notches being correlated to the guide which engages the tape.

References Cited by the Examiner

UNITED STATES PATENTS

| | | | |
|---|---|---|---|
| 940,575 | 11/1909 | Bambauer | 83—553 X |
| 1,742,216 | 1/1930 | Rauber | 83—553 |
| 2,726,721 | 12/1955 | Segal | 83—560 |
| 2,833,350 | 5/1958 | Merkur | 83—451 |

ANDREW R. JUHASZ, *Primary Examiner.*